(12) United States Patent
Nichols et al.

(10) Patent No.: US 7,687,002 B2
(45) Date of Patent: Mar. 30, 2010

(54) SUBSTANTIALLY PROPORTIONAL DRAWING DIE FOR POLYMER COMPOSITIONS

(75) Inventors: Kevin L. Nichols, Freeland, MI (US); Brett M. Birchmeier, Midland, MI (US); Martin H. Tusim, Midland, MI (US); Ian M. Ward, Leeds (GB); Philip D. Coates, Leeds (GB); Phil Caton-Rose, Bradford (GB); Glen P. Thompson, Bradford (GB)

(73) Assignee: Dow Global Technologies, Inc., Midland, MI (US)

( * ) Notice: Subject to any disclaimer, the term of this patent is extended or adjusted under 35 U.S.C. 154(b) by 164 days.

(21) Appl. No.: 11/974,619

(22) Filed: Oct. 15, 2007

(65) Prior Publication Data

US 2008/0111277 A1    May 15, 2008

Related U.S. Application Data

(60) Provisional application No. 60/858,122, filed on Nov. 10, 2006, provisional application No. 60/876,053, filed on Dec. 20, 2006.

(51) Int. Cl.
*B29C 47/00*    (2006.01)
(52) U.S. Cl. .......................... 264/323; 264/164; 264/167
(58) Field of Classification Search ........................ None
See application file for complete search history.

(56) References Cited

U.S. PATENT DOCUMENTS 4,877,393 A * 10/1989 Lo .............................. 425/383

5,234,652 A    8/1993  Woodhams
5,474,722 A   12/1995  Woodhams et al.
7,344,672 B2 *  3/2008  Schroeder et al. ........... 264/473
2006/0057348 A1  3/2006  Maine et al.

FOREIGN PATENT DOCUMENTS

| EP | 1242220 | 5/2004 |
| GB | 206049 | 6/1980 |
| WO | WO-2004/0009334 | 1/2004 |
| WO | WO-2006/041973 | 4/2006 |

OTHER PUBLICATIONS

F W Maine, Oriented wood-polymer composites and related materials, Wood-Polymer Composites, 2008, pp. 208-226, Woodhead Publishing Limited, Cambridge, England.
P. D. Coates and I. M. Ward, Drawing of Polymer through a Conical Die, POLYMER 20, 1553, 1979.
C. E. Chaffey, et al., Orientation in Polypropylene Sheets Produced by Polymer Engineering and Science, Wiley, Hoboken, NJ, Nov. 1997, vol. 37, No. 11, pp. 1774-1784.
O. Richmond, Theory of Streamlined Dies or Drawing and Extrusion, Mechanics of the Solid State, 1968, pp. 154-167.

* cited by examiner

*Primary Examiner*—Monica A Huson
(74) *Attorney, Agent, or Firm*—Steven W. Mork

(57) ABSTRACT

An inventive solid state drawing die has shaping walls that define a shaping channel and that, in the course of solid state drawing, direct polymer composition along a drawing path. Each cross section of the drawing path (and, hence, polymer composition in the drawing path) is non-circular, substantially proportional to one another, contains a centroid that lies on a substantially straight line parallel to the drawing direction and all cross sectional dimensions are 1.5 millimeters or more.

7 Claims, 1 Drawing Sheet

Cut-away view down width dimension of a Proportional Die.

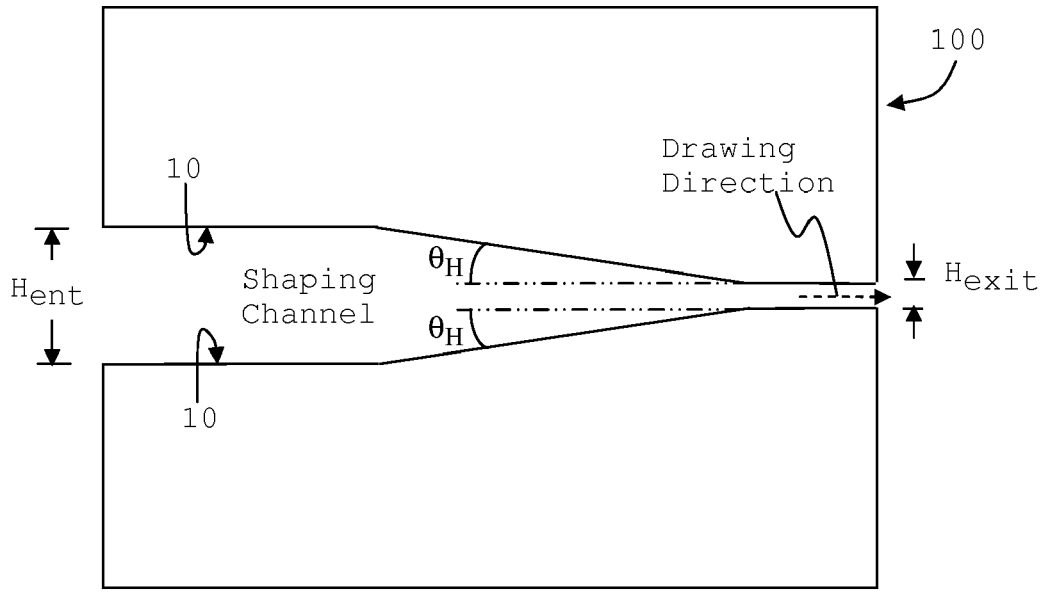
Figure 1A. Cut-away view down width dimension of a Proportional Die.
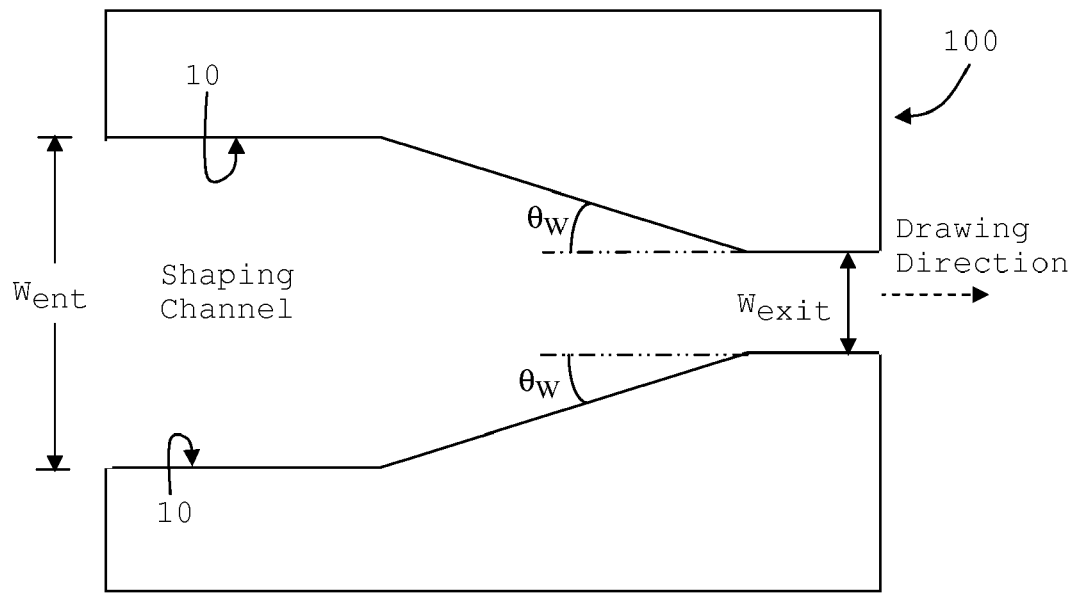
Figure 1B. Cut-away view down height dimension of a Proportional Die.

SUBSTANTIALLY PROPORTIONAL DRAWING DIE FOR POLYMER COMPOSITIONS

This application claims benefit of priority from U.S. Provisional Application Ser. No. 60/858,122, filed on Nov. 10, 2006, and U.S. Provisional Application Ser. No. 60/876,053, filed on Dec. 20, 2006.

BACKGROUND OF THE INVENTION

1. Field of the Invention

This invention relates to a drawing die and a solid state die drawing process for orienting polymer compositions.

2. Description of Related Art

Oriented polymer compositions offer benefits in strength (that is, modulus) over non-oriented polymer compositions. Historically, polymeric films and fibers have enjoyed the benefit of increased strength through orientation in free draw processes. Free draw processes are free of physical restraints controlling drawing and offer little control over a final polymer article's shape. Therefore, free draw processes become less desirable as article cross sections become more complex.

Efforts to establish polymer orientation in articles having cross sections more complex than a fiber or thin film eventually led to solid state die drawing processes. Solid state die drawing processes require drawing a polymer composition through a solid state drawing die. The drawing die forces the polymer to converge towards a specific shape, causing alignment of polymer chains. A solid state drawing die provides more control over final article shape than free drawing processes.

Originally, die drawing processes were used to create articles having a circular cross section, articles such as rods and tubes. (See, for example, P. D. Coates and I. M Ward, *Drawing of Polymers through a Conical Die*, POLYMER 20, 1553 (1979)).

More recently solid state die drawing has been used to achieve large (all cross sectional dimensions greater than 1.5 millimeters (mm)) articles of oriented polymer having a rectangular cross section from a polymer billet having a square cross section. (See, for example, European Patent 1242220B1). The process necessarily directs polymer movement preferentially into the board's width dimension over its thickness dimension.

O. Richmond has developed theory around a drawing die that achieves axisymmetric deformation and streamlined flow. (See, O. Richmond, Theory of streamlined dies for drawing and extrusion. In: F. R. J. Rimrott and J. Schwaighofer, Editors, *Mechanics of the solid state*, University of Toronto Press, Toronto, Ontario, Canada (1968), pp. 154-167. Referred to herein as "the Richmond reference"). The objective of the Richmond reference is to develop a theory around maximizing uniformity of flow and minimizing resistance in a die while achieving axisymmetric deformation of a material. Richmond develops his theory using a cylindrical (circular cross section) article.

BRIEF SUMMARY OF THE INVENTION

The present invention solves a problem discovered while experimenting with solid state drawing of large polymer articles (that is, all cross section dimension greater than 1.5 mm) having a non-circular cross section. The problem is an inability to predictably control the cross sectional shape (that is, shape of a cross section) of an oriented article product upon changing the drawing rate. This problem becomes particularly pronounced when employing nominal draw ratios of four or more. Experimentation led to identifying that the problem likely results from unbalanced polymer movement around the polymer composition centroid during solid state drawing, particularly during free drawing after the polymer composition exits a drawing die.

In order to sufficiently balance polymer movement during solid state drawing and predictably control the shape of a drawn article the drawing die must induce proportional deformation of the polymer composition. The die of the present invention not only requires axisymmetric deformation of the solid state polymer, but proportional deformation throughout the die. Axisymmetric deformation is insufficient to achieve a stable oriented polymer composition, as comparative examples below illustrate. In a preferred embodiment, the die simultaneously achieves axisymmetric, proportional and streamline deformation which constitutes a further enhancement on the theory in the Richmond reference. Moreover, the present invention advances the art of die drawing by providing a means for axisymmetric proportional solid state die drawing for article cross sections more complex than circular and thicker than that of film.

In a first aspect, the present invention is a solid state drawing die for drawing a polymer composition, the die comprising a body having opposing ends and defining a shaping channel that provides fluid communication through the body from one end to the opposing end, the shaping channel begins at one end as an entrance opening and ends at the opposing end of the body as an exit opening, the die having shaping channel walls exposed within the shaping channel and defining the shaping channel, the shaping channel having a non-circular cross sectional shape and having a drawing direction extending in a straight line through the shaping channel, wherein: (a) the shaping channel walls define a polymer composition drawing path extending from the entrance opening to the exit opening in which all cross sections of polymer composition have substantially proportional non-circular cross section shape and have a centroid lying on a substantially straight line parallel to the drawing direction; and (b) all shaping channel cross section dimensions are at least 1.5 millimeters.

In a second aspect, the present invention is a process for solid state drawing of a polymer composition, the process comprising the steps of providing a polymer composition containing an orientable polymer and having a softening temperature, conditioning the polymer composition to a drawing temperature at or below the polymer composition's softening temperature, and drawing the polymer composition through a drawing die, wherein the drawing die is the die of Claim 1 and the polymer composition follows the polymer composition drawing path through the shaping channel.

BRIEF DESCRIPTION OF THE DRAWINGS

FIGS. 1A and 1B illustrate cut-away views of a die of the present invention that has a shaping channel with a rectangular cross sectional shape. FIG. 1A shows a cut-away view as viewed along the die width dimension. FIG. 1B shows a cut-away view as viewed along the die height dimension.

DETAILED DESCRIPTION OF THE INVENTION

Terms

"Solid state" refers to a polymer (or polymer composition) that is below the softening temperature of the polymer (or polymer composition). Hence, "solid state drawing" refers to drawing a polymer or polymer composition that is below the softening temperature of the polymer (or polymer composition).

"Polymer composition" comprises at least one polymer component and can contain non-polymeric components.

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. If the combination of polymers or filled polymer composition only contains miscible polymers and only one crystalline-to-melt phase change is evident in its DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the lowest $T_m$ of the continuous phase polymers.

"Softening temperature" ($T_s$) for a polymer or polymer composition having as polymer components only one or more than one amorphous polymer is the glass transition temperature for the polymer composition.

"Glass transition temperature" ($T_g$) for a polymer or polymer composition is as determined by DSC according to the procedure in ASTM method E1356-03. Determine $T_g$ for a combination of polymer and for a filled polymer composition also by DSC under the same test conditions in E1356-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the highest $T_g$ of the continuous phase polymers.

If the polymer composition contains a combination of semi-crystalline and amorphous polymers, the softening temperature of the polymer composition is the softening temperature of the continuous phase polymer or polymer composition. If the semi-crystalline and amorphous polymer phases are co-continuous then the softening temperature of the combination is the lower softening temperature of the softening temperatures of the two phases.

"Drawing direction" for a die lies on a straight line extending in the direction that the center of mass (centroid) of a polymer composition moves as the polymer composition is drawn through the exit opening of a drawing die. The shaping channel of a die defines the die's drawing direction by means of geometric constraints at and near the exit opening. Therefore, the drawing direction of a die is a characteristic of a die and will be the same for all polymer compositions drawn through that die.

"Centroid" refers to a point whose coordinates are the averages of the corresponding coordinates of a given set of points and which for a given plane corresponds to the center of mass of a thin plate of uniform thickness and consistency or a body of uniform consistency having the same boundary.

"Centroid line" refers to a substantially straight line containing the centroid for all cross sections of a polymer composition in a die's shaping channel. The centroid line for a die of the present invention extends generally parallel to the die's drawing direction.

A "substantially straight line" may deviate from perfectly straight. For example, a "substantially straight line" in the context of the centroid line means than any third point located between first and second points that are spaced at least one centimeter apart deviates from a perfectly straight line defined by the first and a second points by 10% or less, preferably 5% or less, more preferably 2% or less of the distance between the first and second points. Determine percent deviation by dividing the perpendicular distance of the third point from a line between the first two points by the distance between the first two points and then multiply by 100%. A substantially straight line may be perfectly straight.

"Cross sections" herein are perpendicular to the drawing direction through a drawing die unless the reference to the cross section indicates otherwise. A cross section has a perimeter that defines a shape for the cross section (cross sectional shape) and a centroid.

A "cross sectional dimension" is the length of a straight line that connects two points on a cross section's perimeter and extends through the centroid of the cross section. For example, a cross sectional dimension of a rectilinear four-sided shaping channel could be the height or width of the shaping channel.

An artisan understands that a polymer composition typically has a variation in temperature through its cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. Measure the temperature in degrees Celsius (° C.) along a cross sectional dimension by inserting thermocouples to different points along the cross sectional dimension.

"Drawing temperature" is a temperature within a drawing temperature range and is a temperature to which a polymer composition is conditioned prior to drawing and at which the polymer composition exists upon initiation of drawing.

First and second cross sections are "substantially proportional" if the ratio of two cross sectional dimensions of the first cross section is substantially equal to the ratio of the same two cross sectional dimensions in the second cross section. Cross sectional dimensions are the "same" if they lie on a single plane containing the centroid line. The scope of how far "substantially equal" can deviate from perfectly equal is limited by the scope of "substantially proportional."

"Substantially proportional" can include reasonable deviations from perfectly proportional. For example, "substantially proportional" takes into account reasonable machining capabilities in regards to the die shaping channel shape and reasonable control over extruded polymer composition shapes. In its broadest application, "substantially proportional" cross sections can have deviations of 5% or less, preferably 3% or less, more preferably 1% or less from proportional. Determine percent deviation from proportional by dividing the ratio of two cross sectional dimensions for a smaller cross section by a ratio of the same cross sectional dimensions for another larger cross section, subtracting that value from one and multiplying by 100%. For example, measure dimensions AB and CD for a first cross section and corresponding dimensions A'B' and C'D' for a second larger cross section. The percent deviation from proportional for these two cross sections is the absolute value of $100[1-(AB)(C'D')/(A'B')(CD)]$. Substantially proportional can mean perfectly proportional (that is, a 0% deviation from proportional) in any use of the term herein.

"Substantially Balanced" polymer movement refers to a balance in polymer movement forces directed towards the centroid of any polymer composition cross section during drawing. Substantially balanced polymer movement can be perfectly balanced, but can also deviate somewhat from perfectly balanced. Substantially balanced polymer movement is evidenced if a polymer composition maintains a substantially proportional cross sectional shape during drawing.

Use of the terms "substantially proportional", "substantially balanced" and "substantially equal" adopt their strictest interpretation (that is, exactly proportional, balanced or equal) only in the most narrow and ideal embodiment of the present invention. In its broadest scope, the present invention extends beyond the strictest interpretation of these terms and includes tolerances from perfectly proportional or perfectly balanced or perfectly equal. In other words, the terms in context of the present invention allow for some measurable deviation from being exactly proportional or exactly balanced.

"Nominal draw ratio" is the cross sectional area of a polymer composition prior to entering a drawing die divided by the cross sectional area of the polymer composition when its entire cross section ceases to contact the shaping channel walls of the drawing die without again contacting the shaping channel walls. In many cases, the polymer composition will cease to contact the shaping channel walls at the exit of die.

"Streamlined flow" through a die refers to flow through a die that has been optimized to achieve maximum uniformity of flow and minimum flow resistance, in accordance with the definition in the Richmond reference. Notably, "flow" herein does not imply liquid state movement and includes movement of polymer chains as they are deformed through a solid state drawing process.

Drawing Die

The drawing die of the present invention comprises a body having opposing ends. The body can be made of any material or combination of materials suitable for known solid state drawing dies. For example, the die body can comprise aluminum, carbon steel, 4100 series steels, stainless steel hardened or prehardened tool steels, steel alloys containing metals such as nickel, Monel, inconel, molybdenum, or corrosion resistant alloys such as hastelloy. Furthermore, the die may be chromed (desirable for drawing corrosive materials). The material comprising the body, and hence the body itself, is beneficially thermally conductive to facilitate temperature control of a polymer composition undergoing drawing through the die. The body may comprise heating elements or cooling elements in or around the body. For example, the body may incorporate heaters or coolers within the body or wrapped around the body. The body may incorporate heating or cooling elements in the form of channels through which heated fluid or coolant may flow.

The body defines a shaping channel that provides fluid communication through the body from one end to the opposing end. The shaping channel begins at one end of the body as an entrance opening and ends at the opposing end of the body as an exit opening. In one embodiment, the shaping channel is accessible only through the entrance opening and exit opening. Alternatively, the die may have openings that provide access to the shaping channel for the purpose of, for example, injecting processing aids such as lubricants. The shaping channel establishes geometric constraints that dictate a drawing direction for the die and define a polymer composition drawing path.

The portions of the body exposed within the shaping channel are shaping channel walls that define the shape of the shaping channel. Typically, each cross sectional dimension of the shaping channel contains only two points that lie on a shaping channel wall and extends through the centroid of a shaping channel cross section. Shaping channel walls define a polymer composition drawing path ("drawing path") by directing a polymer composition along the drawing path while shaping and orienting the polymer composition. The drawing path extends from the entrance opening to the exit opening. All cross sections of the drawing path, and hence of a polymer composition following the drawing path, have substantially proportional, non-circular shapes and each has a centroid that lies along a centroid line. The drawing path can be equivalent to the shaping channel.

The shaping channel is generally free of any stationary elements that would cause a drawn article to have a hollow cross sectional shape. As such, polymer composition cross sections within the die typically contain only polymer composition. That is, the shaping channel is typically free from any elements residing in the drawing path which may serve to create a hollow article from the polymer composition.

Any polymer composition cross section within the die also desirably has an equal or greater cross sectional area than any other polymer composition cross section more proximate to the exit opening. Generally, any cross section of a polymer composition following the drawing path has a larger cross sectional area than any other polymer composition cross section in the drawing path that is more proximate to the exit opening. Such an embodiment provides continual drawing of the polymer composition to a smaller (smaller in area) cross section. In one particular form of such an embodiment the polymer composition draws down uniformly and proportionately throughout the shaping channel.

All shaping channel cross sections may have substantially proportional non-circular cross sections and a centroid lying on a centroid line. Additionally, the shaping channel walls may lie along the perimeter of the drawing path cross sections. That is, each cross section of the shaping channel may have a shape and area equal to the shape and area of the drawing path cross section in the same plane perpendicular to the drawing direction. Furthermore, any shaping channel cross section may have a larger cross sectional area than any other shaping channel cross section closer to the exit opening.

In one embodiment, the shaping channel uniformly and proportionally reduces in cross sectional area from the entrance opening to the exit opening. Such an embodiment constitutes a uniformly tapering drawing die. Another desirable embodiment comprises a uniformly tapering drawing die with a land section on the exit opening end. In this desirable embodiment the cross section of the shaping channel uniformly and proportionally reduces in cross sectional area from the entrance opening to a certain point prior to the exit opening and then remains essentially constant from that certain point until the exit opening.

The exit opening may be substantially proportional in shape and size to any cross section of a die's polymer composition drawing path and, hence, the cross section of a final oriented polymer article drawn through the die. In one special embodiment the cross section of a drawing path for a die at the die's exit opening is equal in size and shape to the exit opening. In this special embodiment the nominal draw ratio is equal to the cross sectional area of the polymer composition entering the die to the cross sectional area of the exit opening.

Artisans understand that a polymer composition may draw away from the shaping channel walls near the exit opening of a drawing die. Therefore, a drawing path cross section may have smaller area than a shaping channel cross section in the same plane near the exit opening.

Furthermore, the entrance opening may be larger in cross sectional area relative to the polymer composition entering the drawing die. This can be in addition to or instead of the situation where polymer draws away from the shaping channel walls near the exit opening.

The shaping channel wall may deviate from the polymer composition cross sectional perimeter within the drawing path. Artisans realize that polymer compositions drawing through a shaping channel may span gaps or spaces such as grooves, notches and the like in shaping channel walls. Dies of the present invention may or may not have gaps or spaces such as grooves, notches and the like in their shaping channel walls (defined by the shaping channel walls) provided that the centroid of the polymer composition along the resulting drawing path does not deviate from a substantially straight line, preferably a straight line, that is parallel to the drawing direction. The maximum length (measured along a line extending in the die's drawing direction) of such gaps or spaces such as grooves, notches and the like depends on the drawing properties of the particular polymer composition. Dies of the present invention may have gaps or spaces such as grooves, notches and the like in the shaping channel wall particularly if they have a length along a line extending in the die's drawing direction of 1.2 cm or less, even 2.5 cm or less. Components such as lubricants may reside in the grooves, notches and the like to assist in the solid state drawing process. In one embodiment, dies of the present invention are free of any gaps or spaces in the shaping channel walls that exceed two millimeter in length along the drawing direction. In another preferred embodiment the die is free of any gaps or spaces in the shaping channel walls.

All cross sections of a polymer composition in the drawing path, and desirably the shaping channel, have a non-circular cross section. Desirably, all cross sections of the shaping channel also have a non-circular cross section. Typically, non-circular cross sections have a perimeter with two or more, typically three or more sides, even four or more sides. The perimeter may be rectilinear, curvilinear or comprise both curved sides and straight sides. The perimeter may, for example, be a non-circular ellipse, oval, triangle, square, rectangle, pentagon, hexagon, keyhole, arched doorway, or any other profile useful as wood trim or as decking components (for example, railings, boards, spindles). Sides are discernable from one another and connect at a vertex. Sides are discernable if the vertex between them marks a distinct change in shape along the perimeter. For example, a cross section having a shape similar to an arched doorway has a four sided perimeter—three sides that are straight and one that is a continuous arc.

The die of the present invention advances the art by inducing substantially balanced drawing of polymer compositions into shapes having non-circular cross sections. Substantially balanced drawing results from a drawing path where any polymer composition cross section is substantially proportional to any other polymer composition cross section and where the centroid of any polymer composition cross section lies on a substantially straight line that is parallel to the drawing direction. Substantially balanced drawing offers a surprising benefit of maintaining substantially proportional polymer cross sections despite changes in draw rate.

As a specific example of how to achieve substantially balanced drawing, consider a shaping channel that has a cross section shape with two pairs of orthogonal sides, each side in a pair being parallel to one another and perpendicular to the other pair wherein one pair of side extends in the width dimension and the other pair in the height dimension (for example, a square, rectangle, or square or rectangle with one or more rounded corners). Such a shaping channel that maintains the following height and width relationship will provide substantially balanced drawing through a die:

$$\frac{H}{\tan\theta_H} = \frac{W}{\tan\theta_W} \qquad \text{Eqn. 1}$$

H is a height of a desired cross sectional shape (or the height of a particular cross section of the drawing path, for example, $H_{exit}$ in FIG. 1A). W is a width of a desired cross sectional shape (or the width of the same particular cross section of the drawing path that for which H is determined, for example, $W_{exit}$ in FIG. 1B). $\theta_H$ is an angle by which every portion of a cross section extending in the width dimension of the cross section converges towards a plane extending in the width dimension of the cross sections and containing the centroid line of the cross sections over the course of consecutive cross sections that approach the exit opening (see, for example, FIG. 1A). $\theta_W$ is the angle by which every portion of a cross section extending in the height dimension of the cross section converges towards a plane extending in the height dimension of the cross sections and containing the centroid line of the cross sections over the course of consecutive cross sections that approach the exit opening (see, for example, FIG. 1B). Height and width dimensions are perpendicular to one another and mutually perpendicular to the drawing direction. Control the convergence of the shaping channel height and width with the shaping channel walls. Converge the shaping channel walls in order to converge the shaping channel sides. Convergence refers to the approaching of two sides towards each other as one progresses from the entrance opening to the exit opening of a shaping channel.

Without being bound by theory, substantially balanced convergence of the shaping channel walls induces polymer movement that applies substantially balanced force towards the centroid line. When polymer motion is substantially balanced about the centroid line, free drawing that occurs after the die proceeds predictably to a shape substantially proportional to any cross sectional shape of the polymer composition drawing path regardless of whether drawing rate changes. In contrast, maintaining the shape of an article while changing draw rate through a die that induces unbalanced polymer flow is difficult, particularly with a nominal draw ratio of four or more.

In a particularly desirable embodiment, the die of the present invention further achieves streamline flow of a solid state polymer through the die. The methods for achieving streamline flow in a die are known in the art (see, for example, the Richmond reference and references cited therein).

All cross sectional dimensions of the shaping channel are at least 1.5 millimeters. If the die exit opening has a cross sectional dimension less than 1.5 mm it is technically difficult to draw the polymer article into a stable article other than a thin sheet or film. Additionally, it is desirable that the entrance opening have at least one cross sectional dimension of ten centimeters or less (four inches or less). The limit of ten centimeters is beneficial when drawing directly (that is, in-line and continuously) after extruding a polymer composition (polymer billet). Thinner polymer billets cool faster than thicker billets. Polymer billets having a thickness greater than ten centimeters are difficult to cool to a drawing temperature in a suitable amount of time to enable direct solid state drawing after extrusion.

The walls of the shaping channel (or any portion of the walls), and any other portion of the die that polymer may contact, may comprise a coating or an insert. Typical coatings that can be beneficial include abrasion resistant coatings, corrosion resistant coatings and slip enhancing coatings, or any combination of these. Suitable coatings include fluoropolymers such as polytetrafluoroethane (PTFE) and various forms of PTFE such as nickel infused PTFE; molydisulfide; epoxies; polyesters; urethanes; polyethylene; nylons; phenolics; boron nitride; tungsten carbide; aluminum oxide; chromium oxide; magnesium zirconate; aluminum; copper; nickel; molybdenum; yttrium; silicon and combinations thereof.

Inserts are sections of a die that are separable from and, typically, different in composition than surrounding material of a die. Inserts are thicker than a coating but can serve a similar function. For example, the die may contain a ceramic or PTFE portion that serves as a shaping channel wall or portion of a shaping channel wall to reduce the wear of the shaping channel wall and enhance the lifetime of the die. Inserts may be replaceable to allow changing the shape of the shaping channel or to replace a worn insert without having to replace an entire die.

The die body itself may comprise multiple modular components or be a single unitary piece. Modular components are desirable so that a user may modify the size of the entrance or exit opening without having to manufacture an entirely new die. In particular, modular adaptors may be desirable to increase the entrance opening or decrease the exit opening, or both. One desirable die allows for portions to affix to the exit opening end of the die to change the dimension of the exit opening. Preferably, the portions that affix to the die either separate into two or more pieces or hinge open in order to affix or remove them from the die without having to disrupt (for example, break) a continuous polymer line extending through the die and continuing to extend beyond the die. Such a preferred portion can, for instance, bolt together to form a single portion for use on the die and unbolt for adding to or removing from the die around an extension of polymer (that is, pieces bolt around an extension of polymer or a portion clamps around an extension of polymer and is bolted together into a single portion).

The die of the present invention has utility in solid state drawing processes. The die is particularly useful because it allows for variation in draw rate and nominal draw ratio while maintaining a final article cross section that is substantially proportional to a polymer composition draw channel cross section.

Solid State Drawing Process

The process of the present invention is for solid state drawing of a polymer composition. The polymer composition contains an orientable polymer, which is a polymer that can undergo induced molecular orientation by solid state deformation (solid state drawing). Orientable polymer can be amorphous or semi-crystalline (semi-crystalline polymers have a melt temperature ($T_m$) and include those polymers known as "crystalline"). Desirable orientable polymers include semi-crystalline polymers, even more desirable are linear polymers (that is, polymers in which chain branching occurs in less than 1 of 1,000 polymer units). Semi-crystalline polymers are particularly desirable because they result in greater increase in strength and modulus than amorphous polymer compositions. Semi-crystalline polymer compositions can result in 4-10 times greater increase in strength and modulus upon orientation over amorphous polymer compositions.

Suitable orientable polymers include polymers and copolymers of polystyrene, polycarbonate, polypropylene, polyethylene (including high density polyethylene), polymethylpentane, polytetrafluoroethylene, polyamides, polyesters such as polyethylene terephthalate and polybutylene terephthalate, polycarbonates, polyethylene oxide, polyoxymethylene, liquid crystal polymers and blends thereof. Particularly desirably orientable polymers include polyethylene, polypropylene, and polyesters. More particularly desirable orientable polymers include linear polyethylene having a weight-average molecular weight from 50,000 to 3,000,000; especially from 100,000 to 1,500,000, even from 750,000 to 1,500,000. Polyvinylidene fluoride polymers having a weight-average molecular weight of from 200,000 to 800, 000, preferably 250,000 to 400,000 are also suitable.

Polypropylene (PP)-based polymers are especially desirable for use in the present invention. PP-based polymers generally have a lower density than other orientable polymers. Therefore, PP-based polymers facilitate lighter articles than other orientable polymers. Additionally, PP-based polymers offer greater thermal stability than other orientable olefin polymers. Therefore, PP-based polymers may also form oriented articles having higher thermal stability than oriented articles of other polymers.

Suitable PP-based polymers include Zeigler Natta, metallocene and post-metallocene polypropylenes. Suitable PP-based polymers include PP homopolymer; PP random copolymer (with ethylene or other alpha-olefin present from 0.1 to 15 percent by weight of monomers); PP impact copolymers with either PP homopolymer or PP random copolymer matrix of 50-97 percent by weight (wt %) based on impact copolymer weight and with ethylene propylene copolymer rubber present at 3-50 wt % based on impact copolymer weight prepared in-reactor or an impact modifier or random copolymer rubber prepared by copolymerization of two or more alpha olefins prepared in-reactor; PP impact copolymer with either a PP homopolymer or PP random copolymer matrix for 50-97 wt % of the impact copolymer weight and with ethylene-propylene copolymer rubber present at 3-50 wt % of the impact copolymer weight added via compounding, or other rubber (impact modifier) prepared by copolymerization of two or more alpha olefins (such as ethylene-octene) by Zeigler-Natta, metallocene, or single-site catalysis, added via compounding such as but not limited to a twin screw extrusion process.

The PP-based polymer can be ultra-violet (UV) stabilized, and desirably can also be impact modified. Particularly desirable PP-based polymers are stabilized with organic stabilizers. The PP-based polymer can be free of titanium dioxide pigment to achieve UV stabilization thereby allowing use of less pigment to achieve any of a full spectrum of colors. A combination of low molecular weight and high molecular weight hindered amine-type light stabilizers (HALS) are desirable additives to impart UV stabilization to PP-based polymers. Suitable examples of commercially available stabilizers include IRGASTAB™ FS 811, IRGASTAB™ FS 812 (IRGASTAB is a trademark of Ciba Specialty Chemicals Corporation). A particularly desirable stabilizer system contains a combination of IRGASTAB™ FS 301, TINUVIN™ 123 and CHIMASSORB™ 119. (TINUVIN and CHIMASSORB are trademarks of Ciba Specialty chemicals Corporation).

The polymer composition may contain fillers including organic, inorganic or a combination of organic and inorganic. When the filler is a combination of organic and inorganic components it is desirable for the inorganic component to comprise 50 wt % or more, preferably 75 wt % or more of the filler.

Suitable organic fillers include cellulosic materials such as wood flour, wood pulp, flax and rice hulls. Suitable inorganic filler include mica, talc (including any or a combination of materials and grades commonly known and available as "talc"), chalk, titanium dioxide, clay, alumina, silica, glass beads, wollastonite, calcium carbonate, magnesium sulfate, barium sulfate, calcium oxysulfate, tin oxide, metal powder, glass powder, pigments, minerals, glass, ceramic, polymeric or carbon reinforcing agent fillers such as glass fibers, micas, talcs, carbon fibers, wollastonite, graphite, silica, magnesium carbonate, alumina, metal fibers, kaolin, silicon carbide, glass flake and the like. Fillers can serve many purposes include serving to enhance flame retardancy, induce cavitation during the drawing process, and provide partial reinforcement of an article.

The process requires thermally conditioning the polymer composition prior to drawing it through a solid state drawing die by bringing the polymer composition to a drawing temperature ($T_d$) within a drawing temperature range that is between the softening temperature ($T_s$) and 50° C. below $T_s$ of the polymer composition and then initiate drawing of the polymer composition while the polymer composition remains within the drawing temperature range.

Desirably, condition a polymer composition to a drawing temperature of at least five degree Celsius (° C.), preferably at least ten ° C. below its $T_s$. The drawing temperature range can extend to twenty ° C. or more, even thirty ° C. or more below the polymer composition $T_s$. Orientation will not occur to any significant extent if the drawing temperature is above the orientable polymer composition's $T_s$. On the other hand, slow draw rates are necessary if the drawing temperature is too low due to a risk of fracturing the polymer composition during drawing. Generally, the drawing temperature is 40° C. or less below the polymer composition's $T_s$ to avoid fracturing the polymer composition.

After conditioning the polymer composition to a drawing temperature, draw the polymer composition through a drawing die. The solid state drawing process of the present invention uses a drawing die of the present invention. The polymer composition follows the polymer composition drawing path for the drawing die during the drawing process.

Desirably, the polymer composition has a smaller cross section shape (that is, cross sectional area) prior to drawing than the die entrance opening. The polymer composition desirably has a cross sectional shape prior to drawing substantially proportional to and equal or smaller than the entrance opening in the die. The polymer composition can have a cross sectional shape prior to drawing that is substantially proportional to both the entrance opening and exit opening. The polymer composition preferably has a cross section prior to drawing that is substantially proportional to the polymer composition cross section after exiting the drawing die.

It is beneficial to align the die and the polymer composition so that the polymer composition initially contacts the shaping channel walls within the shaping channel at any two points on the polymer composition's cross sectional perimeter within a distance of one another of five millimeters, preferably four millimeters or less, more preferably three millimeters or less, still more preferably two millimeters or less, even more preferably one millimeter or less along the drawing direction. Most desirably, all points around a polymer composition's cross section perimeter initially contact a shaping channel wall at the same point along the drawing direction. Such alignment of the polymer composition and die optimally induces substantially balance polymer movement during drawing.

Minor misalignments are tolerable and become more tolerable with longer die shaping channel lengths. The longer die shaping channel length provides more opportunity to realign polymer movement into a substantially balanced movement around the shaping channel center line. Reasonable deviations due to the ability to align a polymer composition into a drawing die in a typical process are allowable.

Draw the polymer composition through the solid state drawing die by any means suitable for orienting a polymer composition through a solid state drawing die. It is particularly desirable to use a draw rate greater than 25.4 centimeters (10 inches) per minute, preferably greater than 127 centimeters (fifty inches) per minute, more preferably greater than 254 centimeters (100 inches) per minute. Faster draw rates provide more efficient production and the necessary stresses in the polymer composition to achieve a desired level of orientation. Faster draw rates can also facilitate cavitation around filler. An upper limit for the draw rate is unknown. Generally, the upper limit for draw rate is limited to that achievable with a reasonable drawing force. The drawing force should be less than the tensile strength of the polymer composition to avoid fracturing the polymer composition. Typically, the draw rate is 30.5 meters (1200 inches) per minute or less, more typically 9 meters (360 inches) per minute or less.

The process of the present invention is useful for fabricating oriented polymeric articles having a shape that remains constant despite changes in draw rate.

EXAMPLES

Use one of the following three drawing dies for preparing the Examples and Comparative Examples. Each die has an entrance opening of sufficient cross sectional area and shape to fit an initial polymer composition in a form of an initial billet, described below. The initial billet dimensions are such that there is a nominal draw ratio of four for each example and comparative example.

Substantially Proportional Die

The substantially proportional die (for example, 100 in FIGS. 1A and 1B) has a rectangular shaping channel as in FIGS. 1A and 1B. Determine the angles by which each shaping wall converges using the relationship of Eqn. 1. Shaping walls 10 converge to an exit opening that has a width (that is, $W_{exit}$ in FIG. 1B) that is 12.7 mm (0.5 inches) and a height (that is, $H_{exit}$ in FIG. 1A) that is 3.175 mm (0.125 inches). The walls spanning the height of the channel (that is, $\theta_w$ in FIG. 1B) converge at 15° angle to reduce the width while the walls spanning the width dimension (that is, $\theta_H$ in FIG. 1A) converge at a 3.83° angle to reduce the height dimension. The substantially proportional die is within the scope of the present invention and satisfies the relationship of Eqn 1: $(H/\tan \theta_H) = (W/\tan \theta_W) = 47.4$ mm (1.87 inches).

Mill billets of initial polymer composition to a cross sectional dimension of 2.54 cm (one inch) wide by 0.635 cm (0.25 inches) high for drawing through the substantially proportional die. The entrance opening of the substantially proportional die has a height ($H_{ent}$ in FIG. 1A) of 1.75 cm (0.69 inches) and a width ($W_{ent}$ in FIG. 1B) of 6.88 cm (2.71 inches).

Absolute Die

The absolute die has an exit opening identical to the substantially proportional die. However, all walls of the shaping channel converge at 10° angles when traveling from the entrance opening to the exit opening. The absolute die induces axisymmetric deformation yet is outside the scope of the present invention.

Mill billets of initial polymer composition to a cross sectional dimension of 1.83 cm (0.721 inches) wide by 0.879 cm (0.346 inch) tall for drawing through the absolute die.

Constant Width Die

The constant width die has an exit opening identical to the substantially proportional die. However, the width of the shaping channel does not change (that is, the entrance opening has a width of 3.175 (0.125 inches) while the walls defining the height converge at 10° angles when traveling from the entrance opening to the exit opening. The constant width die induces axisymmetric deformation yet is outside the scope of the present invention.

Mill billets of initial polymer composition to a cross sectional dimension 1.27 cm (0.5 inch) wide by 1.27 cm (0.5 inches) tall for drawing through the constant width die.

TABLE 1

Four Initial Polymer Compositions

| Composition | Polymer | Filler |
|---|---|---|
| (a) | Nucleated polypropylene-ethylene random copolymer having 0.5 wt % ethylene component and a melt flow rate of 3 (for example, INSPIRE D404.01 from The Dow Chemical Company) | 46 wt % Talc composition based on total composition weight. Talc composition is 50-60 wt % talc and 40-50 wt % magnesium carbonates having a median diameter of 16.4 microns. (for example, TC-100 from Luzenac) |
| (b) | [same as (a)] | 30 wt % 80 mesh pine wood flour based on total polymer composition weight. (suitable pine wood flour is available, for example, from American Wood Fibers) |
| (c) | Polypropylene-ethylene random copolymer having 3.2 wt % ethylene and a melt flow rate of 1.9 (for example, 6D83K from The Dow Chemical Company). | [same as (a)] |
| (d) | [same as (c)] | [same as (b)] |

Prepare four initial polymer compositions (a, b, c and d as described in Table 1) by the following procedure: compound the polymer and filler using a Farrell Continuous Mixer (FCM). Feed polymer and filler into the specified weight ratio through standard loss in weight feeders. Melt the polymer in the FCM and mix the filler into the polymer matrix to form a polymer/filler mix. Feed the polymer/filler mix from the FCM into a single screw extruder and then through a multi-hole strand die to produce multiple strands of the polymer/filler mix. Cool the strands under water and cut them into pellets. Re-extrude the pellets into a part (billet) having a larger cross section than the initial polymer composition. Mill the billet to have cross sectional dimensions of 2.54 cm (one inch) wide by 0.635 cm (0.25 inches) tall to provide the initial polymer composition. Mill an initial tab on an end of each billet that is smaller in dimension than any point in the shaping channel and longer than the length of the die. The tab extends through the die for attaching an actuator to pull the rest of the billet through the die.

Condition each billet to 150° C. (about 10° C. below the softening temperature of the billet composition) prior to drawing through the drawing die. Draw a billet through a drawing die by extending the initial tab through the drawing die, gripping the tab with an actuator and then pulling the billet through the drawing die using an MTS hydraulic tester, model number 205. Center the billet in the shaping channel of each die. Draw the billet slowly at first to orient the leading edge and then bring to a specific draw rate. Use three different draw rates for each of the four different polymer compositions: 2.54 centimeters per minute (cm/min), 25.4 cm/min and 254 cm/min.

Table 2 identifies the combinations of parameters defining twelve examples with the substantially proportional die (Examples 1-12), twelve comparative examples with the absolute die (Comparative Examples A1-A12) and twelve comparative examples with the constant width die (Comparative Examples B1-B12).

TABLE 2

| Substantially Proportional Die Example | Absolute Die Comparative Example | Constant Width Die Comparative Example | Polymer Composition | Draw Rate |
|---|---|---|---|---|
| 1 | A1 | B1 | a | 2.54 |
| 2 | A2 | B2 | a | 25.4 |
| 3 | A3 | B3 | a | 254 |
| 4 | A4 | B4 | b | 2.54 |
| 5 | A5 | B5 | b | 25.4 |
| 6 | A6 | B6 | b | 254 |
| 7 | A7 | B7 | c | 2.54 |
| 8 | A8 | B8 | c | 25.4 |
| 9 | A9 | B9 | c | 254 |
| 10 | A10 | B10 | d | 2.54 |
| 11 | A11 | B11 | d | 25.4 |
| 12 | A12 | B12 | d | 254 |

The final measurable for comparison is the height-to-width ratio (H/W) of the final drawn article. The target H/W is 0.25 (that of the die exit opening). Deviations from 0.25 in the final article reveal how extensively the final article deviates from being exactly proportional to the target cross sectional dimensions (that is, the exit opening H/W ratio).

Table 3 presents the H/W for each Example and Comparative Example as well as the percent deviation of each from the 0.25 target (difference from target divided by target and then multiplied by 100%). The percent deviation is in parentheses with each H/W value. NOTE: The number in Table 3 corresponds to the Example number for the substantially proportional die, which is also the Comparative Example number without the A or B prefix for the absolute die and constant width die.

TABLE 3

H/W Values and Percent Deviation from Target

| Number | Substantially Proportional Die (Number = Example number) | Absolute Die (Number = Comparative Example less A prefix) | Constant Width Die (Number = Comparative Example less B prefix) |
|---|---|---|---|
| 1 | 0.255 (2%) | 0.248 (1%) | 0.259 (4%) |
| 2 | 0.256 (2%) | 0.260 (4%) | 0.262 (5%) |
| 3 | 0.248 (1%) | 0.271 (8%) | 0.284 (14%) |
| 4 | 0.253 (1%) | 0.260 (4%) | 0.303 (21%) |
| 5 | 0.252 (1%) | 0.276 (10%) | 0.314 (26%) |
| 6 | 0.249 (0%) | 0.282 (13%) | 0.362 (45%) |
| 7 | 0.251 (0%) | 0.258 (3%) | 0.246 (2%) |
| 8 | 0.250 (0%) | 0.268 (7%) | 0.255 (2%) |
| 9 | 0.247 (1%) | 0.279 (12%) | 0.263 (5%) |
| 10 | 0.252 (1%) | 0.266 (6%) | 0.290 (16%) |
| 11 | 0.253 (1%) | 0.286 (14%) | 0.302 (21%) |
| 12 | 0.257 (3%) | 0.284 (14%) | 0.318 (27%) |

Examples 1-12 illustrate that varying the draw rate through a substantially proportional die over two orders of magnitude results in a percent deviation from a target shape of 3% or less for a wide range of polymer compositions. The final article shape remains substantially proportional to the target shape (that is, experiences 5% deviation or less) over the full two orders of magnitude draw rate change. The shapes also remain substantially proportional (that is, experiences 5% deviation or less) with respect to one another over the two orders of magnitude draw rate range. Hence, the substantially proportional die of the present invention provides a consistent article shape over a broad range of draw rates and polymer compositions, a consistent shape that is substantially proportional to the cross section of the polymer composition drawing path at the exit opening of the die.

In contrast, neither the absolute die nor the constant width die provide oriented articles that remain substantially proportional as the draw rate spans the two orders of magnitude since they all result in deviations in excess of 5% from the target shape as the draw rate changed for each polymer composition. Variation in draw rate has a significant (greater than 5% deviation) effect on article shape when oriented through an absolute die or a constant width die.

What is claimed is:

1. A process for solid state drawing of a polymer composition, the process comprising the steps of:
   (a) providing a polymer composition containing an orientable polymer and having a softening temperature;
   (b) conditioning the polymer composition to a drawing temperature at or below the polymer composition's softening temperature; and
   (c) drawing the polymer composition through a drawing die;
wherein the drawing die is a solid state drawing die for drawing a polymer composition, the die comprising a body having opposing ends and defining a shaping channel that provides fluid communication through the body from one end to the opposing end, the shaping channel begins at one end as an entrance opening and ends at the opposing end of the body as an exit opening, the die having shaping channel walls exposed within the shaping channel and defining the shaping channel, the shaping channel having an non-circular cross sectional shape and having a drawing direction extending in a straight line through the shaping channel, wherein: (i) the shaping channel walls define a polymer composition drawing path extending from the entrance opening to the exit opening substantially proportional non-circular cross section shape and have a centroid lying on a substantially straight line, a centroid line, parallel to the drawing direction; and (ii) all shaping channel cross section dimensions are at least 1.5 millimeters; and where the polymer composition follows the polymer composition drawing path through the shaping channel and experiences free drawing after exiting the drawing die, wherein the die induces polymer movement that applies a substantially balanced force about the centroid line.

2. The process of claim 1, wherein any cross section of the polymer composition drawing path has a larger area than any cross section of the polymer composition drawing path that is closer to the exit opening.

3. The process of claim 1, wherein the polymer composition prior to entering the drawing die and after exiting the drawing die has substantially proportional non-circular cross section shapes.

4. The process of claim 1, wherein the polymer composition initially contacts the shaping channel walls within the shaping channel at any point on the polymer composition's cross sectional perimeter within five millimeters along the drawing direction of any other point on the polymer composition's cross sectional perimeter.

5. The process of claim 1, wherein the shaping channel walls define one or more gaps or spaces that extend 2.5 centimeters or less along the die drawing direction and wherein the polymer composition prior to entering the drawing die has a cross sectional shape proportion to the entrance and exit openings.

6. The process of claim 1, wherein the drawing temperature is from ten to forty degrees Celsius below the polymer composition melt temperature.

7. The process of claim 1, wherein the polymer composition comprises a polymer selected from polypropylene-based polymers and high density polyethylene.

* * * * *